US009167511B2

(12) United States Patent
Lee et al.

(10) Patent No.: US 9,167,511 B2
(45) Date of Patent: Oct. 20, 2015

(54) UTILIZING CLIENT MOBILE DEVICES FOR WIRELESS NETWORK MONITORING

(75) Inventors: Jung Gun Lee, Mountain View, CA (US); Sung-Ju Lee, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 357 days.

(21) Appl. No.: 13/563,664

(22) Filed: Jul. 31, 2012

(65) Prior Publication Data

US 2014/0036696 A1 Feb. 6, 2014

(51) Int. Cl.
*H04W 48/18* (2009.01)
*H04W 8/20* (2009.01)
*H04W 48/14* (2009.01)

(52) U.S. Cl.
CPC ............... *H04W 48/18* (2013.01); *H04W 8/20* (2013.01); *H04W 48/14* (2013.01)

(58) Field of Classification Search
CPC ...... H04W 24/00; H04W 36/00; H04W 48/00
USPC ......................................... 370/252, 331, 338
See application file for complete search history.

(56) References Cited

U.S. PATENT DOCUMENTS

| 7,155,167 | B1 | 12/2006 | Carty | |
| 7,519,695 | B2 | 4/2009 | Farhat et al. | |
| 7,971,251 | B2 | 6/2011 | Sinha | |
| 2002/0188723 | A1* | 12/2002 | Choi et al. | 709/225 |
| 2003/0022657 | A1* | 1/2003 | Herschberg et al. | 455/414 |
| 2003/0031157 | A1* | 2/2003 | Zeira et al. | 370/342 |
| 2004/0063455 | A1* | 4/2004 | Eran et al. | 455/525 |
| 2007/0086388 | A1* | 4/2007 | Kang et al. | 370/331 |
| 2008/0096580 | A1 | 4/2008 | Montemurro | |
| 2009/0291686 | A1* | 11/2009 | Alpert et al. | 455/436 |
| 2009/0310501 | A1* | 12/2009 | Catovic et al. | 370/252 |
| 2010/0002667 | A1* | 1/2010 | Lin | 370/338 |
| 2010/0105379 | A1* | 4/2010 | Bonner et al. | 455/433 |
| 2011/0019556 | A1 | 1/2011 | Hsin et al. | |
| 2011/0170433 | A1* | 7/2011 | Scobbie | 370/252 |
| 2012/0140705 | A1* | 6/2012 | Matta et al. | 370/315 |

OTHER PUBLICATIONS

Cisco, "Optimize the Cisco Unified Wireless Network to Support Wi-fi Enabled Phones and Tablets" 2010, http://www.cisco.com/en/US/solutions/collateral/ns340/ns394/ns348/ns767/white_paper_c11-634584_ns828_Networking_Solutions_White_Paper.html.

* cited by examiner

*Primary Examiner* — Andrew Lai
*Assistant Examiner* — Sumitra Ganguly
(74) *Attorney, Agent, or Firm* — Hewlett-Packard Patent Department (57) ABSTRACT

Example embodiments disclosed herein relate to utilizing client mobile devices for wireless network monitoring. Link quality data for wireless networks are measured by a plurality of wireless client devices and are provided to a network controller. The link quality data is usable to manage a wireless local area network (WLAN). The wireless networks include at least the WLAN and a cellular network. A recommendation for connection is provided to the wireless client devices, where the recommendation indicates if the cellular network is recommended or an access point of the WLAN.

15 Claims, 5 Drawing Sheets

UTILIZING CLIENT MOBILE DEVICES FOR WIRELESS NETWORK MONITORING

BACKGROUND

Constant monitoring of network channels is often required to provide high network performance because wireless channel conditions vary over time and are difficult to predict. This is especially the case in indoor wireless networks where the wireless radio frequency (RF) propagation is affected by walls, windows, other RF signals, and even humans. Wireless channel quality monitoring is a challenging task as the quantity and quality of data required to manage, control, mitigate interferences, and improve security and coverage of the wireless network is often not available. Accordingly, enterprise network managers/administrators are challenged to improve network performance with the little network data available at their disposal.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Due to advances in technology, wireless client devices e.g., personal mobile devices) have become popular. Moreover, the wireless client devices have become smaller and more powerful such that users typically carry multiple wireless client devices at any given time to satisfy their mobile computing and communication needs. For example, there currently exist a variety of wireless client devices such as smartphones, mobile phones, laptops, tablets, notebooks, portable personal computers, personal digital assistants (PDAs), digital cameras, gaming devices, portable reading devices, and so on, that are small, lightweight, and easily carried by users. Further, with recent developments in the enterprise wireless networks such as the BYOD (Bring Your Own Device) trend, where employees bring their own personal mobile devices to connect to the enterprise wireless network (e.g., a wireless local area network (WLAN)), the availability and use of multiple wireless client devices in the enterprise wireless network by employees may be leveraged to provide network quality data.

Accordingly, network quality data measurements from the wireless client devices may be used to supplement (or in addition to) measurements from the wireless access points of the network to improve the network coverage, performance, and security. Because the wireless client devices are located in different parts of the network coverage area (e.g., on different floors and sections of an office building), a large amount of quality network data may be harnessed from the wireless client devices and usable by a network controller to improve performance of the network. Moreover, the data from the wireless client devices may be utilized to maintain network security, for example, by detecting interferences and the presence of rogue access points and initiating removal of such rogue access points. In addition, the wireless client devices can measure not only WLAN signal quality but also cellular network (e.g., 3G, 4G, LTE, etc). Based on the performance (e.g., signal quality) of the cellular networks and the WLAN, the network controller can provide a recommendation to the wireless client devices on which connectivity to use and when/where to handoff/offload, thereby improving wireless connectivity experience of users.

In an example implementation, the network controller may provide an application (e.g., a measurement application) to be downloaded on the wireless client devices seeking connection to the WLAN managed by the network controller. For example, this may be provided in exchange for the privilege to connect to the WLAN. The application, when downloaded and installed on the wireless client devices, enable measurement and transmission of link quality data for a plurality of access points of the WLAN, and location information of the wireless client devices to the network controller via one or more of the WLAN access points. The link quality data measurements from the wireless client devices represent useful information from different vantage points in the WLAN and that cover more area (i.e., due to user mobility and also due to the number of devices that are performing the monitoring/measurements) than information from just the WLAN access points. With such robust information, the network controller is able to make informed and accurate decisions to improve the throughput and security of the WLAN. For example, based on the information, the network controller is able to implement channel assignments, power control, rate adaptation, association control, and so on.

It is appreciated that embodiments described herein below may include various components and features. Some of the components and features may be removed and/or modified without departing from a scope of the method, system, and non-transitory computer readable medium for utilizing client mobile devices for wireless network monitoring. It is also appreciated that, in the following description, numerous specific details are set forth to provide a thorough understand of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiments or example is included in at least one example, but not necessarily in other examples. The various instances of the phrase "in one embodiment" or similar phrases in various places in the specification are not necessarily all referring to the same embodiment. As used herein, a component is a combination of hardware and software executing on that hardware to provide a given functionality.

Figure 1:
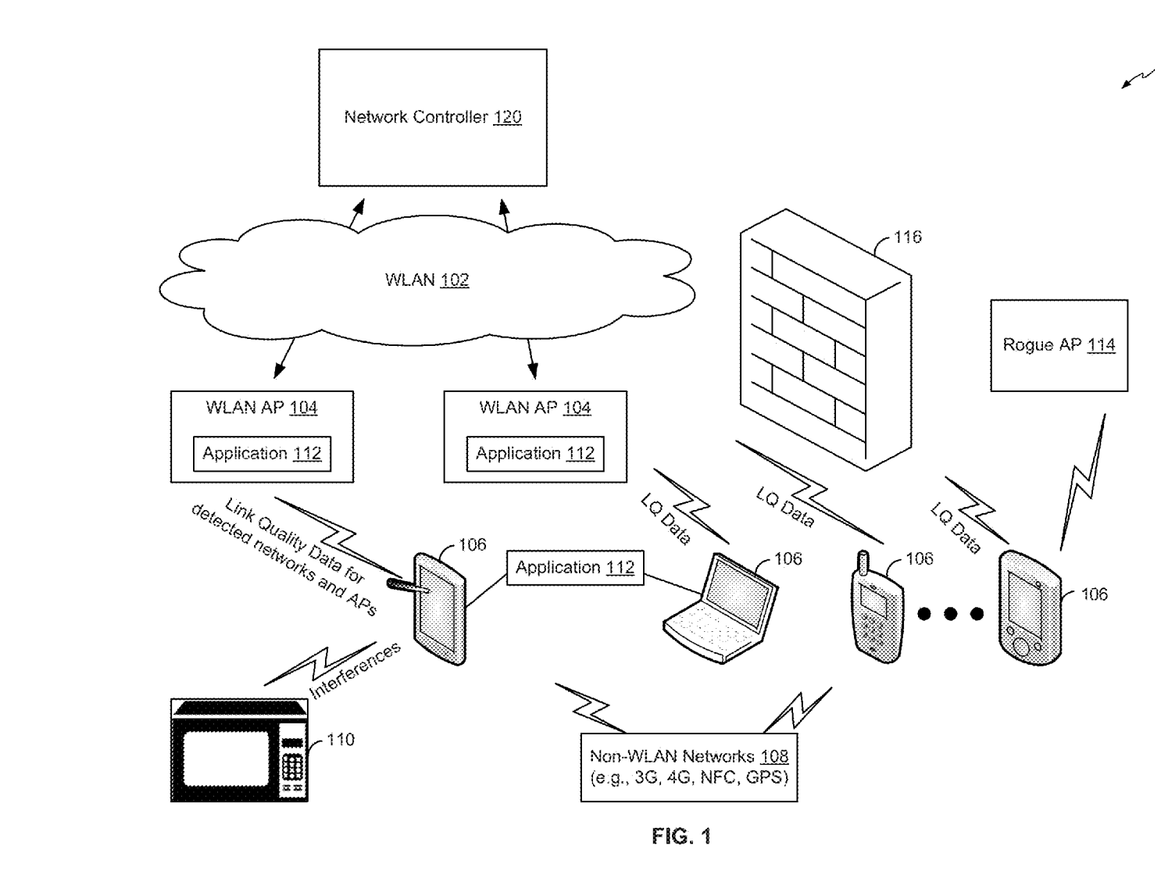
FIG. 1 is a schematic diagram illustrating an example environment in which the various embodiments may be implemented.

Referring now to FIG. 1, a schematic diagram illustrating an example environment in which the various embodiments may be implemented is described. Environment 100 includes, for example, network controller 120 that manages WLAN 102 service provided to a plurality of wireless client devices 106 via a plurality of access points 104. Thus, access points 104 are managed and controlled by the network controller 120. For example, access points 104 include legitimate access points operated by a corporation or enterprise information technology (IT) department. Access points 104 may be deployed in various locations within a coverage zone of the WLAN 102 to provide service to the plurality of authorized wireless client devices 106. For example, a particular access point 104 may provide WLAN 102 access to a cell (i.e., the access point and its clients). The wireless client devices 106 may include at least one of a smartphone, a mobile phone, a personal digital assistant (PDA), a portable personal computer, a desktop computer, a multimedia player, an entertainment unit, a data communication device, and a portable reading device that has wireless communication capability.

Wireless client devices 106 may be configured to operate in a plurality of wireless networks such as third generation mobile telecommunications (3G) network, a fourth generation mobile telecommunications (4G) network, a long term evolution (LTE) network, LTE Plus network, wireless wide area network (WLAN), wireless personal area network (WPAN), global system for mobile communications (GSM) network, code division multiple access (CDMA) network, time division multiple access (TDMA) network, frequency division multiple access (FDMA) network, orthogonal frequency division multiple access (OFDMA) network, single-carrier frequency division multiple access (SC-FDMA) network, worldwide interoperability for microwave access (WiMAX) network, digital advanced mobile phone system (DAMPS) network, global positioning system (GPS) network, television (TV) network, quick response (QR) codes, near field communications (NFC) signals, and so on. For example, the wireless client devices 106 may operate in a cellular network (e.g., 3G, 4G, LTE) to transmit and send voice and data signals. Wireless client devices 106 may also receive interferences such as interference from microwaves 110. Environment 100 may also include one or more rogue access points 114 that are not authorized by the network controller 120. For example, rogue access point 114 may be operating behind a firewall 116 of the WLAN 102.

The network controller 120 may provide each authorized access point 104 (i.e., WLAN access points) and each authorized wireless client device 104 with application 112 (e.g., a software application). Application 112 may be executable to measure link quality data for a plurality of wireless networks including the WLAN 102. In one example, access points 104 may include application 112 for measuring link quality data for other access points 104 within range. In another example, wireless client devices 106 may include application 112 for measuring link quality data for the access points 104 detectable by the wireless client devices 106 and link quality data for other networks such as cellular networks of the wireless client devices 106. Link quality data may include, for example, at least one of signal to noise ratio (SNR), signal to interference plus noise ratio (SINR), received signal strength indication (RSSI), modulation and coding scheme (MCS), transmit power level, transmit rate, data throughput, latency, and loss rate. The measured link quality data may be received by the network controller 120 from the access points 104 and the wireless client devices 106. For example, each access point 104 may directly provide measured link quality data to network controller 120. As another example, each wireless client device 106 may provide measured link quality data to network controller 120 via one or more access points 104.

Link quality data includes a list of access points 104 detected by the wireless client devices 106. Thus, if there rogue access point 114 is present in the WLAN 102, wireless client devices provide this information to the network controller 120. For example, wireless client devices 106 may actively probe the access points to detect one or more rogue access points 114, if present. Further, wireless client devices 106 may provide location information of the wireless client devices 106 to network controller 120. Accordingly, application 112 executed on client devices 106 may passively measure and provide link quality data to network controller 120 (including any rogue access points 114) and provide location information to network controller 120. Similarly, application 112 is executable by a processor of access points 104 to measure and provide link quality data to network controller 120.

Based on link quality data received from wireless client devices 106 and access points 104, location information from wireless client devices 106, and access points detectable by wireless client devices 106, network controller 120 may improve the throughput and security of the WLAN. In one example embodiment, the network controller 120 may provide a priority list of access points (i.e., the WLAN access points 104) to the wireless client devices 106 for WLAN communication, based on the received link quality data. In addition, because the received link quality data includes link quality data for the cellular network, the network controller 120 may recommend the cellular network to the wireless client devices 106 for communication. For example, the cellular network may be recommended for connection when link quality for the cellular network is greater than link quality for the WLAN (e.g., when no access point 104 of the WLAN provides better performance to a wireless client device 106 than the cellular network).

Further, network controller 120 may implement channel assignments, power control, rate adaptation, association control, removal of rogue access points (when present), and so on, based on the link quality data. Accordingly, the described embodiments provide an expanded WLAN monitoring coverage and a denser deployment of monitoring agents. For example, sources of security and performance problems (e.g., interferences 110 and rogue access points 114) outside of the access points' 104 range, and that are thus "hidden" may be detected. Further, by utilizing a plurality of wireless client devices 106, access points 104 may be configured to allocate more time serving clients (i.e., freeing up the access points 104), thereby increasing WLAN 102 capacity. Moreover, client based monitoring enables faster and easier detection of performance and security issues.

Figure 2:
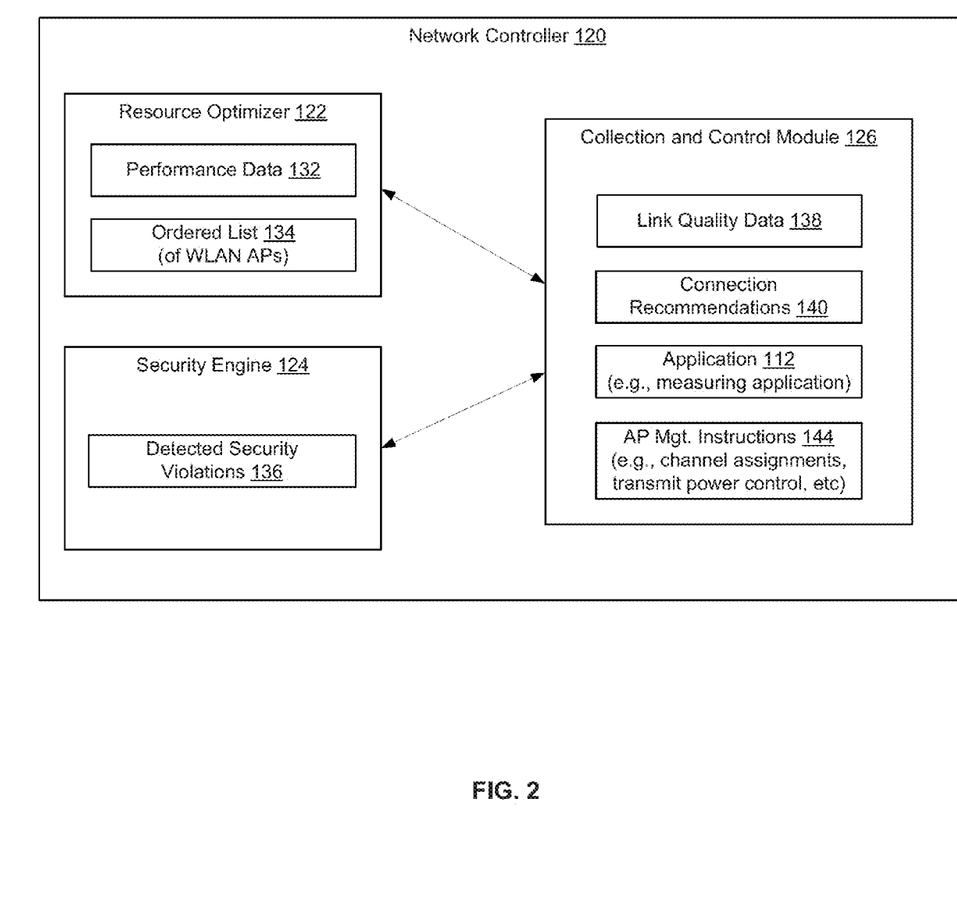
FIG. 2 is a schematic diagram illustrating an example network controller according to various embodiments.

Attention is now directed to FIG. 2, which illustrates an example network controller according to various embodiments. Network controller 120 includes a collection and control module 126, a resource optimizer engine, and a security engine 124.

Collection and control module 126 may include application 112 that may be provided to the wireless client devices 106 and to the access points 104. Application 112, when executed on the wireless client devices may passively measure and transmit link quality data 138 to the network controller 120. For example, measurements and network monitoring may not be performed when the battery level of the wireless client device is low. Alternately, or in addition, measurements may be performed periodically as specified by the network controller 120. Further, network controller 120 may direct a set of wireless client devices 106 to perform specific monitoring such as, for example, scanning specified channels for a period of time and report any non-WLAN interference activities, or scanning all channels to detect a transmitter with a specific medium access control (MAC) address. It should be appreciated that the network controller 120 may provide various network monitoring instructions to some or all of the wireless client devices 106 at different times to gather important performance and security information about the WLAN 102.

Collection and control module 126 may be configured to receive link quality data 138 for a plurality of wireless networks including at least one of WLAN 102 and a cellular network (e.g., 3G, 4G, LTE, etc). Link quality data 138 may be received from at least one of the wireless client devices 106 and the access points 104. Further, collection and control module 126 may be configured to receive location information from the wireless client devices 106, and information regarding interferences such as microwave interference 110, and detected rogue access points 114, if any.

Collection and control module 126 may provide the link quality data 138 to resource optimizer 122 and to security engine 124. Based on the link quality data 138, resource optimizer 122 may generate performance data 132 for each of the access points 104 and may generate an ordered list 134 of access points 104 for each of the wireless client devices 106. The ordered list 134 may include connection recommendations 140 for the wireless client devices 106. For example, a first wireless client device 106 may be directed to connect to a first access point 104 at a particular time because the first access point 104 provides the best network connection (e.g., best signal quality) to the wireless client device 106 compared to a second access point 104 and the cellular network. As another example, a second wireless client device 106 may be directed to connect to the cellular network (e.g., to the second wireless client device's cellular provider) because the cellular network provides the network connection (e.g., best signal quality) at that particular time and location compared to the first and second access points 104.

Resource optimizer 122 may further be configured to generate a connectivity and interference map of the WLAN 102. Based on the connectivity and interference map, coverage holes in the WLAN 102 may be detected and the network controller 120 may deploy new access points 104 and/or change location of existing access points 104 to manage the coverage holes. In addition, resource optimizer 122 may identify interferences in the WLAN 102 and may perform at least one of reassigning network channel of one or more of the access points and controlling transmission power of adjacent access points 104 to eliminate such interferences.

Security engine 124 may be configured to identify security violations in the WLAN 102 based on link quality data 138, location information of the wireless client devices 106, and information regarding detected access points. For example, because the link quality data includes a list of detected access points, if a rogue access point 114 is present in the WLAN 102, the security engine 124 may detect its presence from the list and may initiate removal of the rogue access point 114 from the WLAN 102. Further, the security engine 124 may provide information about the detected rogue access point 114 to the wireless client devices 106 and advise refraining from connecting to the rogue access point.

Accordingly, resource optimizer 122 and security engine 124 may provide connectivity data/information to the collection and control module 126 for transmission to the wireless client devices 106 and the access points 106. Further, access point management instructions 144 may be generated based on the information received from the resource optimizer 122 and the security engine 124. For example, access point management instructions 144 may include channel assignments, transmit power control, and other instructions to manage the access points 104.

Figure 3:
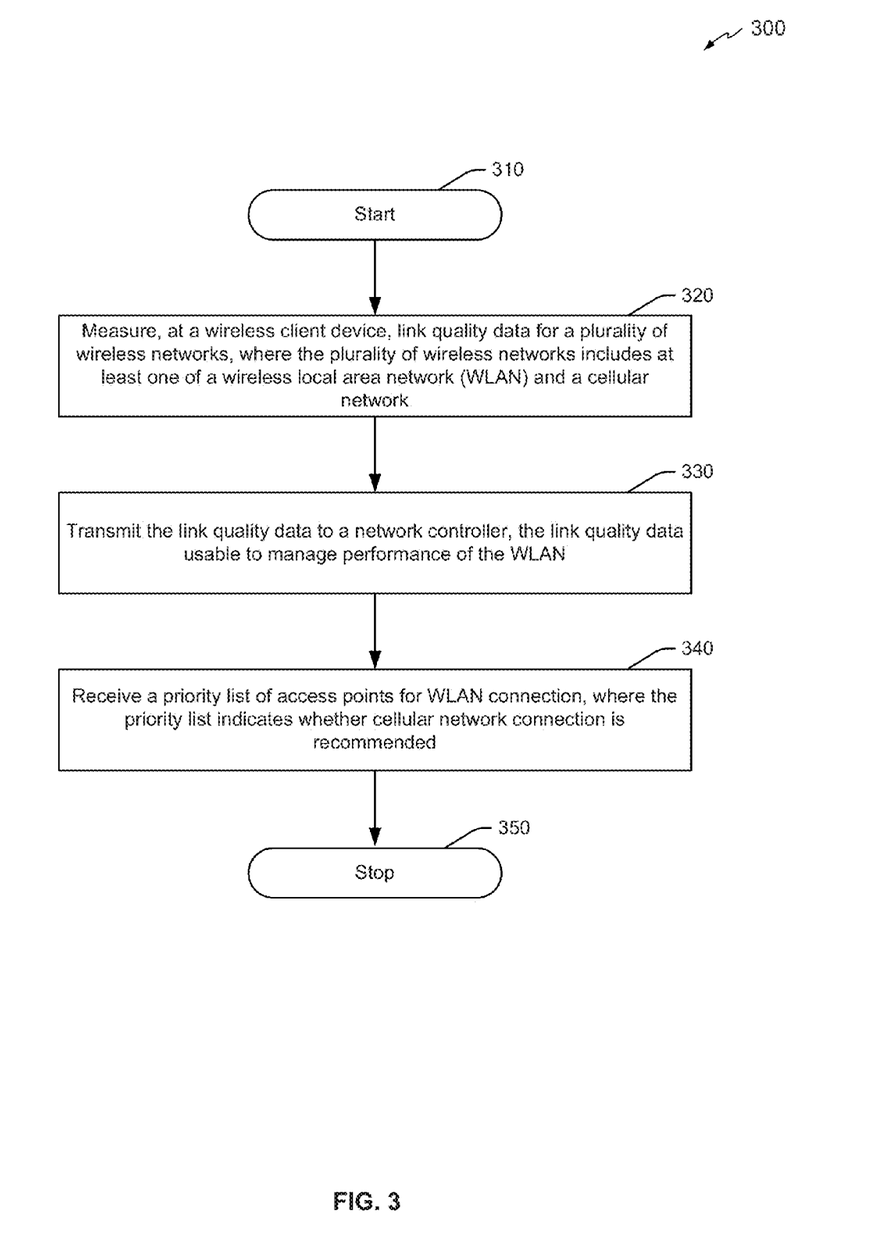
FIG. 3 is a flowchart for monitoring wireless network at a wireless client device according to various embodiments.

FIG. 3 is a flowchart of an embodiment of a method 300 for monitoring wireless network at a wireless client device. Method 300 may be implemented in the form of executable instructions stored on a machine-readable storage medium and/or in the form of electronic circuitry.

Method 300 may start in block 310 and proceed to block 320, where link quality data for a plurality of wireless networks is measured at a wireless client device. The plurality of wireless networks includes at least one of a WLAN and a cellular network. For example, wireless client devices 106 may measure link quality data corresponding to access points 106 of the WLAN 102 and/or link quality data corresponding to a cellular network (e.g., 3G, 4G, LTE, etc.).

After the measurement is performed, method 300 may proceed to block 330, where the link quality data is transmitted to a network controller. The link quality data is usable by the network controller to manage performance of the WLAN. For example, the wireless client devices 106 may transmit the link quality data to the network controller 120 via one or more access points 104. The link quality data may include location information of the wireless client devices 106, a list of access points 104 detectable by the wireless client devices 106 (and rogue access points 114, if present).

Method 300 may proceed to block 340, where a priority list of access points for WLAN connection is received at the wireless client devices. The priority list may indicate whether the cellular network connection is recommended. For example, the wireless client devices 106 may each receive a corresponding priority list indicating how to establish wireless connection. To illustrate, a particular access point 104 may be recommended for a particular wireless client device 106. Alternately, the cellular network may be recommended for the particular wireless client device 106. Method 300 may then proceed to block 350, where the method 300 stops.

Figure 4:
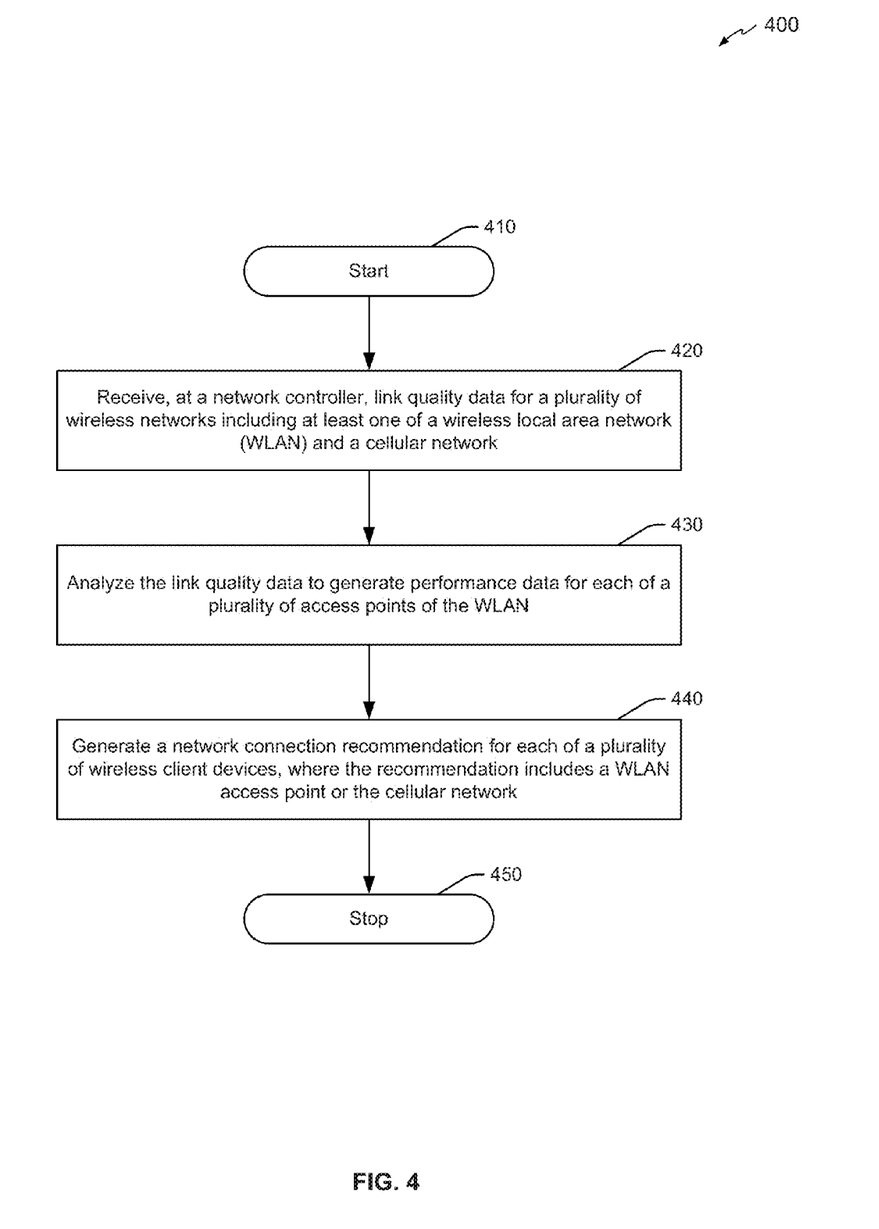
FIG. 4 is a flowchart for utilizing client mobile devices for wireless network monitoring.

FIG. 4 is a flowchart of an embodiment of a method 400 for utilizing client mobile devices for wireless network monitoring. Method 400 may be implemented in the form of executable instructions stored on a machine-readable storage medium and/or in the form of electronic circuitry.

Method 400 may start in block 410 and proceed to block 420, where link quality data for a plurality of wireless networks including at least one of a WLAN and a cellular network is received at a network controller. For example, wireless client devices 106 may provide link quality data to network controller 120. Further, access points 104 may provide link quality data to network controller 120.

Method 400 may proceed to block 430, where the link quality data is analyzed to generate performance data for each of a plurality of access points of the WLAN. For example, collection and control module 126 may provide the received link quality data to resource optimizer 122 and security 124 for analysis.

Method 400 may then proceed to block 440, where a network connection recommendation for each of a plurality of wireless client devices is generated, where the recommendation includes a WLAN access point or the cellular network. For example, based on the analysis, a priority list of access points including the connection recommendation may be provided to the wireless client devices 106. To illustrate, the recommendation may suggest that the wireless client devices connect to an access point 104 or to the cellular network. Method 400 may then proceed to block 450, where the method 400 stops.

Figure 5:
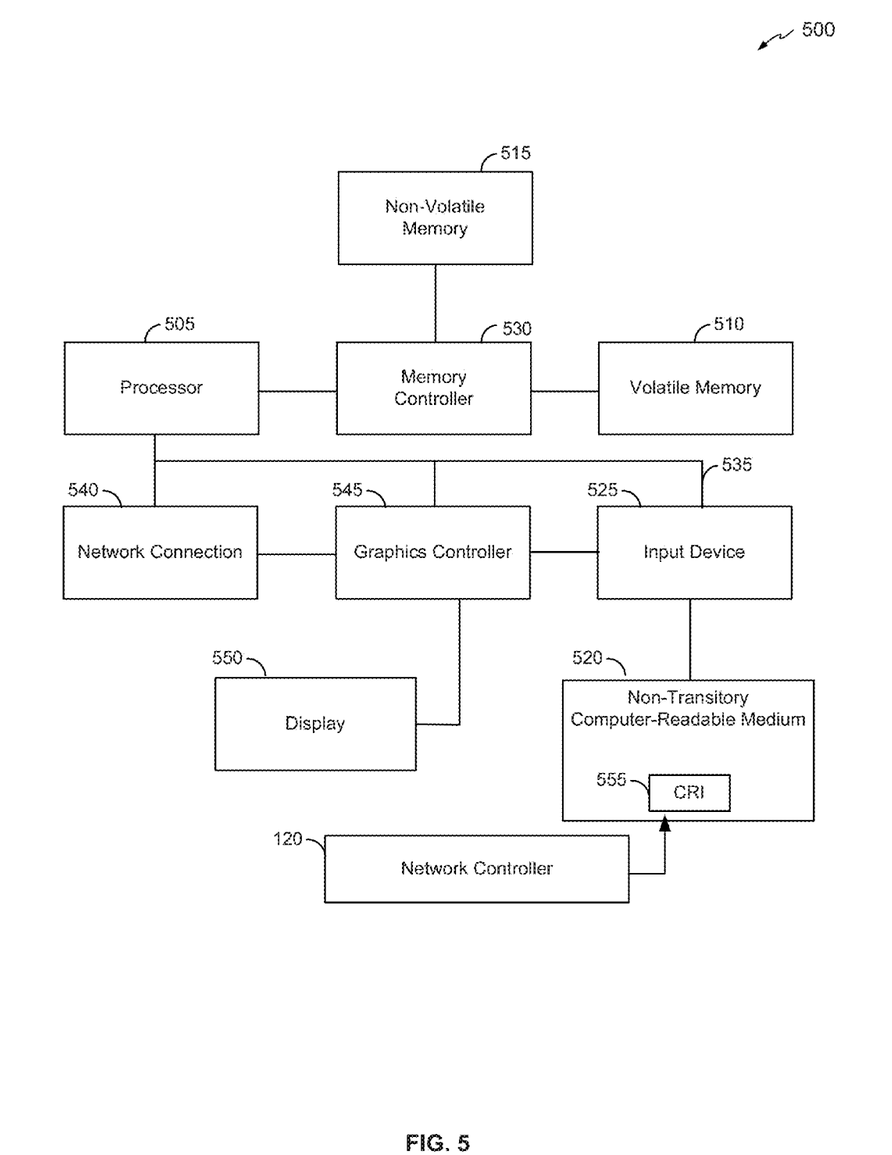
FIG. 5 is a block diagram of an example component for implementing the network controller of FIG. 2 according to various embodiments.

The network controller 120 of FIGS. 1 and 2 can be implemented in hardware, software, or a combination of both. FIG. 5 illustrates a component for implementing the network controller 120 according to various embodiments. The component 500 can include a processor 505 and memory resources, such as, for example, the volatile memory 510 and/or the non-volatile memory 515, for executing instructions stored in a tangible non-transitory medium (e.g., volatile memory 510, non-volatile memory 515, and/or computer readable medium 520). The non-transitory computer-readable medium 520 can have computer-readable instructions 555 stored thereon that are executed by the processor 505 to implement a network controller that utilizes client mobile devices for wireless network monitoring according the present disclosure.

A machine (e.g., a computing device) can include and/or receive a tangible non-transitory computer-readable medium 520 storing a set of computer-readable instructions (e.g., software) via an input device 525. As used herein, the processor 505 can include one or a plurality of processors such as in a parallel processing system. The memory can include memory addressable by the processor 505 for execution of computer readable instructions. The computer readable medium 520 can include volatile and/or non-volatile memory such as a random access memory ("RAM"), magnetic memory such as hard disk, floppy disk, and/or tape memory, a solid state drive ("SSD"), flash memory, phase change memory, and so on. In some embodiments, the non-volatile memory 515 can be a local or remote database including a plurality of physical non-volatile memory devices.

The processor 505 can control the overall operation of the component 500. The processor can be connected to a memory controller 530, which can read and/or write data from and/or to volatile memory 510 (e.g., RAM). The processor 505 can be connected to a bus 535 to provide communication between the processor 505, the network connection 540, and other portions of the component 500. The non-volatile memory 515 can provide persistent data storage for the component 500. Further, the graphics controller 545 can connect to an optical display 550.

Each component 500 can include a computing device including control circuitry such as a processor, a state machine, ASIC, controller, and/or similar machine. As used herein, the indefinite articles "a" and/or "art" can indicate one or more of the named objects. Thus, for example, "a processor" can include one or more than one processor, such as in a multi-core processor, cluster, or parallel processing arrangement.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciate that the present disclosure is not limited to a particular configuration, such as component 500.

Those skilled in the art would further appreciate that the various illustrative modules and steps described in connection with the embodiments disclosed herein may be implemented as electronic hardware, computer software, or combination of both. For example, the steps of FIGS. 3 and 4 may be implemented using software modules, hardware modules or components, or a combination of software and hardware modules or components. Thus, in one embodiment, one or more of the example steps of FIGS. 3 and 4 may comprise hardware modules or components. In another embodiment, one or more of the steps of FIGS. 3 and 4 may comprise software code stored on a computer readable storage medium, which is executable by a processor.

To clearly illustrate this interchangeability of hardware and software, various illustrative components, blocks, modules, and steps have been described above generally terms of their functionality (e.g., network controller 120). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A method comprising:
   measuring, at a wireless client device, link quality data for at least one access point of a wireless local area network (WLAN) comprising a plurality of access points;
   transmitting the link quality data to a network controller, the link quality data usable to manage the WLAN;
   receiving a priority list of access points for WLAN connection, wherein the priority list indicates a particular access point of the plurality of access points that is recommended for the wireless client device to connect to the WLAN, wherein the priority list is generated by the network controller based on link quality data received from a plurality of wireless client devices and the plurality of access points; and
   connecting the wireless client device to the particular access point of the plurality of access points based on the priority list.

2. The method of claim 1, further comprising transmitting location information of the wireless client device to the network controller, wherein the location information is usable by the network controller to deploy new access points, change location of one or more access points, change transmit power of one or more access points, or any combination thereof.

3. The method of claim 1, further comprising receiving an application from the network controller, wherein the application is executable by a processor of the wireless client device to perform measurement and transmission of the link quality data to the network administrator.

4. The method of claim 1 further comprising:
   measuring, at the wireless client device, link quality information for a cellular network; and
   transmitting the link quality information for the cellular network to the network controller,
   wherein the priority list is further based on the link quality information for the cellular network, and wherein the priority list further indicates whether a cellular network connection is recommended.

5. The method of claim 1, wherein the link quality data comprises at least one of signal to noise ratio (SNR), signal to interference plus noise ratio (SINR), received signal strength indication (RSSI), modulation and coding scheme (MCS), transmit power level, transmit rate, data throughput, latency, and loss rate.

6. A method comprising:
   receiving, at a network controller, link quality data for a plurality of access points of a wireless local area network (WLAN), wherein the link quality data is received from a plurality of wireless client devices and the plurality of access points of the WLAN;
   analyzing the link quality data to generate performance data for each of the plurality of access points of the WLAN;
   generating, based on the performance data for each of the plurality of access points, a network connection recommendation for a particular wireless client device of the plurality of wireless client devices, wherein the recommendation indicates a particular access point of the plurality of access points that is recommended for the particular wireless device to use for a network connection to the WLAN; and connecting the particular wireless client device to the particular access point of the plurality of access points based on the network connection recommendation.

7. The method of claim 6, further comprising providing the network connection recommendation to the particular wireless client device of the plurality of wireless client devices via a first access point of the plurality of access points.

8. The method of claim 6, further comprising providing configuration information to the plurality of WLAN access points, wherein the configuration information includes at least one of channel assignment, transmit power control, and rate adaptation, based on the link quality data.

9. The method of claim 6, further comprising:
receiving location information for each of the plurality of wireless client devices; and
managing location and transmit power for each of the plurality of WLAN access points based on the location information of the wireless client devices.

10. The method of claim 9, wherein managing location of the WLAN access points includes at least one of deploying new access points and changing location of the access points.

11. A network controller comprising:
a collection and control module to receive link quality data corresponding to a plurality of access points of a wireless local area network (WLAN) from a plurality of wireless client devices and the plurality of access points of the WLAN;
a resource optimizer engine to:
generate performance data for each of the plurality of WLAN access points based on the link quality data; and
generate, based on the performance data, an ordered list of WLAN access points for a plurality of wireless client devices, wherein the ordered list indicates, for each the plurality of wireless client devices, a recommended WLAN access point to connect to the WLAN, wherein the plurality of wireless client devices are to connect to the recommended WLAN access points based on the ordered list;
a security engine to determine security violations in the WLAN network based on the link quality data.

12. The network controller of claim 11, the collection and control module further to provide an application process to the plurality of WLAN access points and the plurality of wireless client devices, the application process executable to measure the link quality data at the WLAN access points and at the wireless client devices.

13. The network controller of claim 11, the resource optimizer engine further to:
generate a connectivity and interferences map of the WLAN access points and the wireless client devices served by the network controller;
identify coverage holes in the WLAN based on the map; and
deploy new WLAN access points or change locations of the WLAN access points to cover the identified coverage holes.

14. The network controller of claim 11, the resource optimizer engine further to:
reassign network channel of a WLAN access point with signal interferences; and
control transmission power of adjacent WLAN access points to prevent interferences.

15. The network controller of claim 11, the security engine further to:
determine and identify when a rouge access point is present in the WLAN; and
initiate removal of the rogue access point from the WLAN.

\* \* \* \* \*